July 10, 1951 H. M. GUINOT 2,560,103
MANUFACTURE OF NON-SATURATED ALDEHYDES
Filed Aug. 8, 1945
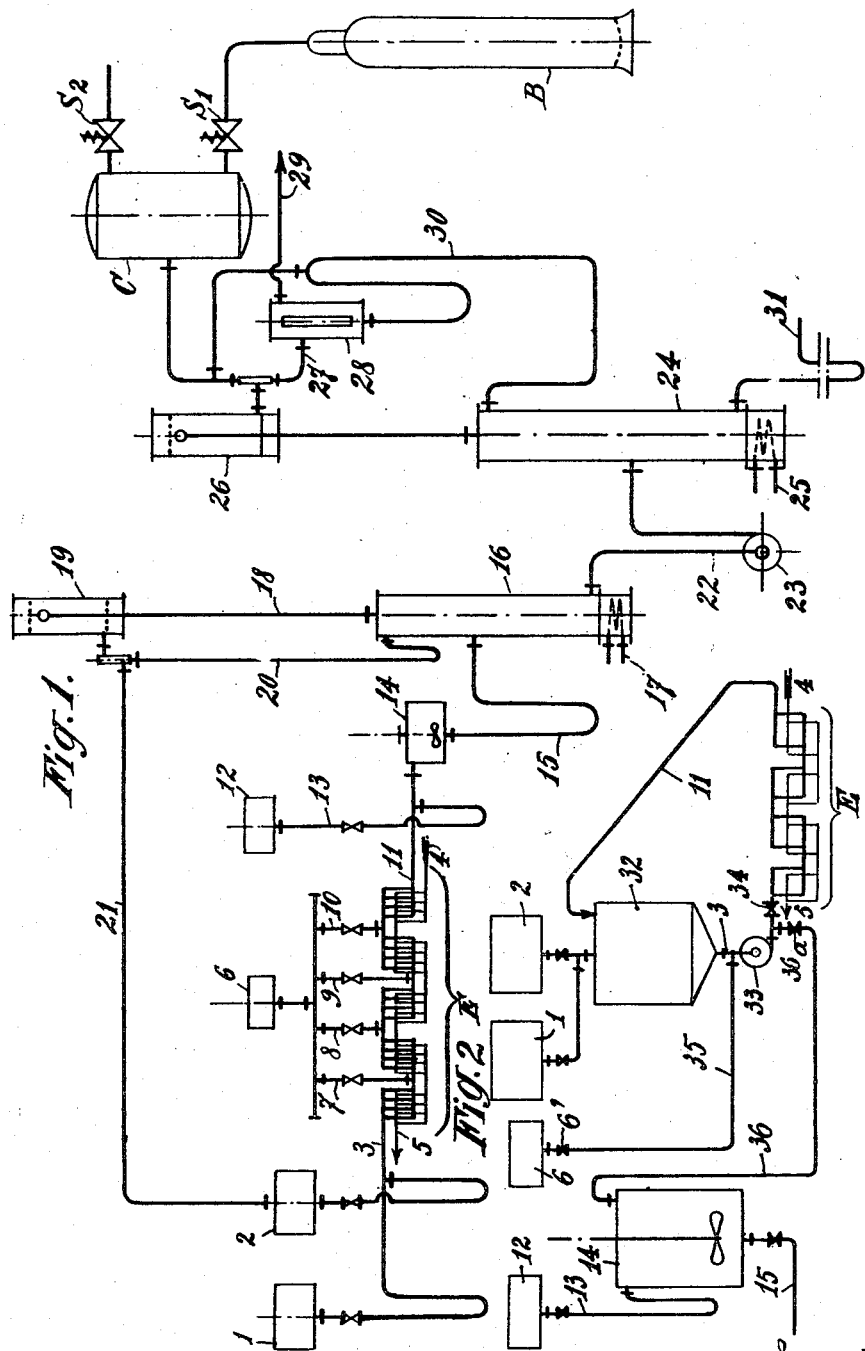
Inventor
Henri Martin Guinot
By Stevens and Davis
His attorneys Patented July 10, 1951

UNITED STATES PATENT OFFICE 2,560,103

MANUFACTURE OF NONSATURATED ALDEHYDES

Henri Martin Guinot, Versailles, France, assignor to Les Usines de Melle (Société Anonyme), Saint-Leger-les-Melle, France, a company of France Application August 8, 1945, Serial No. 609,675
In France March 6, 1940

Section 1, Public Law 690, August 8, 1946
Patent expires March 6, 1960

3 Claims. (Cl. 260—601)

It is known to condense acetaldehyde with itself in aqueous solution by means of a caustic alkali, then to dehydrate into crotonaldehyde the aldol thus formed, without previously isolating the same, by boiling its aqueous solution in the presence of a strong acid, such as phosphoric acid, crotonaldehyde being eliminated, as soon as it is formed, as azeotropic water-crotonaldehyde mixture boiling at 85° centigrade.

The condensation of aldehyde is generally carried out discontinuously in a cooled vat provided with stirring means, while the cooling is effected outwardly, or better by means of a condenser coil arranged within the vat itself.

In industrial practice in which it is frequent to work with charges of aldehyde amounting to several tons, such method presents serious difficulties, because the cooling means employed in this case are powerless to absorb the heat suddenly released by the reaction which is strongly exothermic. This danger has been often referred to by prior authors, in particular by Gruenstein in his Swiss Patent No. 90,297 of March 18, 1919.

It has been sought, however with little success, to avoid this difficulty by intentionally slowing down the reaction, either through a very progressive and cautious addition of alkali or through the employment of less energetic catalysts.

The present invention has for its object certain improvements which permit of considerably accelerating the condensation of aldehyde to aldol as well as the subsequent dehydration of aldol, while avoiding the risks due to violence of the reaction and enabling nearly quantitative yields to be obtained. The invention also enables the manufacture to be carried out in a continuous process.

This invention essentially consists in carrying out the condensation of aldehyde in a heat exchanger of a type known per se and countercurrent operated so as to permit of a powerful exchange of heat between the reaction mixture and the fluid intended for cooling. It is advantageous for carrying the invention into practical effect to use an exchanger that is as efficient as possible, and to this end the apparatus industrially known as "baffle plate exchanger" (or so-called "A. P. V." apparatus manufactured by The Aluminium Plant and Vessel Company Limited, London) is particularly suitable. Such an exchanger is known to be constituted by a number of metal plates separated by full walls and mounted, horizontally or vertically according to types thereof, on an appropriate frame. Each one of these plates is provided on its two faces with outstanding baffles adapted to cause the liquid introduced at one of the corners to travel along a zig-zag course before it flows out at the angle opposed. The liquid to be cooled is thus made to flow over one of the faces of the plate, while the cooling liquid circulates along the other face thereof, but in the opposite direction. In this way a perfect counter-current is realised and an excellent heat exchange ensured. An appropriate arrangement of intermediate plates will permit, if desired, of a certain number of successive plates working in parallel.

The amount of caustic soda necessary for the aldol condensation is introduced into the mixture of water and aldehyde passing through such a heat exchanger as above described so that the composition of the final mixture corresponds to the aldehyde-aldol equilibrium. Heat liberated by the reaction is removed by appropriate circulation of the cooling fluid within the exchanger.

A further improvement contemplated by the invention consists in adjusting, by suitable addition of a strong acid, the pH of the aldol solution to a value between 2 and 6, and, after removal of unconverted aldehyde, in carrying out the dehydration under a small super-atmospheric pressure between 0.5 and 5 kilograms per square centimeter. I have found that the pressure very notably accelerates the dehydration of aldol while permitting excellent yields to be obtained. Thus, when operated under the super-atmospheric pressure of 0.5 kg., the dehydration is three times as rapid as when using room pressure; it is six times quicker under the super-atmospheric pressure of one kilogram, and nine times quicker under the super-atmospheric pressure of two kilograms.

In order to show how the invention may readily be carried into practical effect, the same will now be described with reference to the accompanying drawing which is given for the purpose of illustration, but not of limitation, and in which:

Fig. 1 schematically shows a complete plant operating in a continuous way;

Fig. 2 schematically shows an aldolisation plant operating in a discontinuous way.

Water and aldehyde fed from tanks 1 and 2, respectively (Fig. 1), are mixed in desired proportion before being introduced through a pipe 3 into a heat exchanger E of baffle plate type. This exchanger E has been shown diagrammatically as comprising five elements constituted each by four plates operating in parallel. For the purpose of simplification the plates per se have not been shown, there having only been indicated the flow in counter-current, on the one hand, of the water-aldehyde mixture (thick lines) and, on the other hand, of the cooling fluid (thin lines), the latter penetrating into the exchanger at one end as at 4 and flowing out at the other end as at 5. It is evident that each of the two liquids travels successively, in series, through the five elements of the exchanger and always inversely with respect to each other.

There is added to the aqueous solution of aldehyde passing through the heat exchanger the amount of caustic soda [fed from a tank 6] necessary for the aldolisation. This amount is preferably introduced, by means of valved pipes 7—8—9—10, at several points of the circuit in order that the condensation of aldehyde be terminated when the liquid leaves the apparatus. Care is taken to introduce the first fraction of soda lye (pipe 7) preferably at a point where the heat initially produced by the mixing of aldehyde with water has been absorbed and where, therefore, the aqueous solution of aldehyde is already cooled.

There is introduced into the exchanger at 4 a volume of cooling fluid sufficient for absorbing the heat produced by the reaction of aldolisation.

To the aldo-aldehyde mixture in equilibrium flowing out of the exchanger at 11, there is added, through the medium of a tank 12 and pipe 13, the quantity of acid necessary not only for its neutralisation, but also for its acidification up to a pH between 2 and 6. After homogenizing in a stirring tank 14, the acidified mixture is introduced through a pipe 15 into the middle zone of a distillation column 16 heated from its base as at 17. From the head of this column, unchanged aldehyde escapes through a pipe 18, and after condensation at 19, is partially returned through a pipe 20, the remainder being reintroduced into the tank 2 through a pipe 21.

At the base of column 16 there flows out the acid aqueous solution of aldol free from aldehyde but already containing a little of corresponding unsaturated aldehyde. This solution is introduced through a pipe 22 and pump 23 into a distillation column 24 heated from its base at 25 and operated under a slight pressure. Owing to the latter, unsaturated aldehyde is formed with a great rapidity and is immediately carried away by water vapour in the form of an azeotropic mixture which, after condensation in condenser 26, flows out through a pipe 27 and into a decanter 28 in which it is separated into two layers: the upper layer, consisting in wet unsaturated aldehyde, is removed via line 29 and then distilled in a last column (not shown) for obtaining the anhydrous product; the lower aqueous layer is reintroduced through a pipe 30 into the top of the column 24. At the base of the latter there flows out through a pipe 31 an aqueous solution free from all valuable products and containing only the salt corresponding to added alkali and acid. The vents of the apparatus communicate with a capacity tank C connected with a compressed inert gas (nitrogen) container B and provided with control valves $S_1$ and $S_2$ for adjusting the pressure to a desired value.

*Example.—Manufacture of crotonaldehyde*

250 kg. acetaldehyde per hour plus 250 kg. water per hour were introduced into the heat exchanger E. The quantity of heat produced by the mixing was approximately 15,000 kilogram-calories per hour which were easily absorbed in the first elements of the exchanger.

There was introduced into the circuit, at four different points thereof, a quantity of aqueous caustic soda having a strength of 10% sufficient to bring the pH of the liquid to 9 at the end of the aldolization reaction. The quantity of soda added for obtaining this result varied somewhat with the purity of water and acetaldehyde employed. Generally it amounted approximately to 750 grams of NaOH, i. e., 7.5 liters per hour of aqueous caustic soda of 10% strength.

The reaction of aldolisation produced 30,000 kilogram-calories per hour. There was introduced into the exchanger at 4 a current of cooling water at 15° Cent. sufficient to maintain the temperature of the liquid in the apparatus not substantially above 30° centigrade.

The mixture flowing out of the exchanger still contained 45% of the initial acetaldehyde in the free state, the remainder having been converted to aldol. There was added thereto a quantity of sulphuric acid sufficient for its neutralisation and for bringing its pH to 4, i. e. altogether 1,200 grams of $H_2SO_4$.

The mixture was then freed from acetaldehyde in the column 16, and was thereafter introduced into the distillation column 24 operated under two kilograms/sq. centimeter pressure. From the base of the column a stream of an aqueous solution of sulphate of sodium was removed and sent to waste. From the head of the column an amount of wet crotonaldehyde corresponding to 109 kg. per hour of the pure product was obtained.

The yield amounted to 98% of the theoretical.

Although continuous operation, as just described, is more advantageous, my invention includes effecting the step of aldolisation batchwise, this way presenting certain practical advantages, particularly when an existing plant is to be utilised.

In Fig. 2 there is schematically shown a plant for discontinuous aldolisation operating according to the principle of the present invention.

Suitable quantities of water and aldehyde are introduced into a tank 32 from tanks 1 and 2. The tank 32 at its bottom is connected by a pipe 3 with a pump 33 which is adapted to cause the liquid in the tank 32 to circulate through the exchanger E, at the outlet end of which the cooled liquid is reintroduced through a pipe 11 back into the tank 32. The pump 33 is put into motion from the very beginning of charging the tank so as to remove immediately the heat produced by the mixing. When the tank 32 is charged, the valves of tanks 1 and 2 are closed and there is introduced through a pipe 35 into the suction end of the pump 33 soda lye from a tank 6, this addition being adjusted by means of a valve 6'. Of course, the addition of soda, instead of being effected at the outlet end of the exchanger E, as shown in Fig. 2, may be effected between the first and the second element of the exchanger.

In any case, owing to the circulation produced by the pump 33 between the exchanger E and tank 32, the heat produced by the adolization reaction is easily absorbed.

If the temperature of the circulating liquid ostensibly tends to rise, it will be easy to slow down such a rise by altering the velocity of circulation of the liquid and the throughput of cooling water in the exchanger. When the mixture contained in the tank 32 has a composition corresponding to the aldol-aldehyde equilibrium, which requires approximately 2 to 3 hours against 12 to 18 hours as per prior processes in the most favorable cases, the valve 34 is closed and the valve 36a opened, while the pump 33 is kept on running, whereby the liquid in the tank 32 is pumped through a pipe 36 into the tank 14 wherein it is acidified and wherefrom it is then introduced through the pipe 15 into the system of distillation columns, as previously described, for its transformation into unsaturated aldehyde.

Without departing from the scope of the invention, certain modifications of detail may be made in the process and apparatus above described.

In particular, the invention is not limited to the employment of a baffle plate exchanger, and other types of exchangers may, therefore, be used, although the production capacity of a given plant as well as its efficiency, to a certain extent, vary with the efficiency of the exchanger.

It may also be found advantageous to carry out the distillation in the column 16 under a slight pressure in order to insure a proper condensation of acetaldehyde without having to utilise condensers of too large dimensions.

As catalysts for aldolisation, besides caustic soda, other known agents of condensation may be employed, such as potash, lime, baryte, alkaline carbonates.

Furthermore, the phase of transformation into unsaturated aldehyde may also be effected in a discontinuous way.

Finally, the process is also applicable to the treatment of the homologues of acetaldehyde. Thus, it permits of transforming butyraldehyde into α-ethyl-β propylacrolein with practically quantitative yields.

What I claim is:

1. In the production of an unsaturated aldehyde from an aqueous solution of an aldolized lower alkanal, the steps of acidifying said solution to a pH-value between 2 and 6, and distilling said acidified solution at a superatmospheric pressure of between 0.5 and 5 kg. per sq. cm. above atmospheric pressure.

2. In the production of an unsaturated aldehyde from an aqueous solution of an aldolized lower alkanal containing a substantial proportion of unconverted lower alkanal, the steps of acidifying said solution to a pH value between 2 and 6, distilling said solution to substantially free it of said lower alkanal, and thereafter distilling said solution at a superatmospheric pressure of between 0.5 to 5 kg. per sq. cm. above atmospheric pressure to obtain an azeotropic mixture of the desired unsaturated aldehyde with water.

3. In the continuous production of an unsaturated aldehyde from an aqueous solution of an aldolized lower alkanal containing a substantial proportion of unconverted lower alkanal, the steps of passing said soution to a first distillation zone; introducing a controlled amount of acid into the solution thus passed, to secure a pH-value between 2 and 6 for said solution; distilling said solution thus acidified, in said first distillation zone substantially under atmospheric pressure to substantially free it of said lower alkanal; forcing said solution thus de-alkanalized from said first distillation zone into a second distillation zone; and maintaining a superatmospheric pressure of between 0.5 and 5 kg. per sq. cm. above atmospheric pressure in said second distillation zone, while distilling said de-alkanalized solution in the same to cause evolution therefrom of an azeotropic mixture of the desired unsaturated aldehyde with water.

HENRI MARTIN GUINOT.

REFERENCES CITED

The following references are of record in the file of this patent:

UNITED STATES PATENTS

| Number | Name | Date |
| --- | --- | --- |
| 1,450,984 | Matheson | Apr. 10, 1923 |
| 1,587,661 | Lommen | June 8, 1926 |
| 1,598,522 | Herrly | Aug. 31, 1926 |
| 1,738,659 | Maude | Dec. 10, 1929 |
| 1,881,853 | Mueller-Cunradi et al | Oct. 11, 1932 |
| 2,229,306 | Prestage | Jan. 21, 1941 |
| 2,269,935 | Hanford et al. | Jan. 13, 1942 |
| 2,317,456 | Hanford et al | Apr. 27, 1943 |
| 2,318,341 | Thompson | May 4, 1943 |
| 2,341,229 | Mueller-Cunradi et al. | Feb. 8, 1944 |
| 2,376,070 | Metzger | May 15, 1945 |

FOREIGN PATENTS

| Number | Country | Date |
| --- | --- | --- |
| 598,015 | Germany | June 4, 1934 |